(12) United States Patent
Hayasaka et al.

(10) Patent No.: US 7,839,040 B2
(45) Date of Patent: Nov. 23, 2010

(54) PERMANENT-MAGNET GENERATOR ROTOR FOR GAS TURBINE, MANUFACTURING METHOD THEREFOR, AND GAS TURBINE

(75) Inventors: Yasushi Hayasaka, Mito (JP); Hideaki Nagashima, Okegawa (JP); Manabu Sasaki, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 59 days.

(21) Appl. No.: 12/097,609

(22) PCT Filed: Dec. 16, 2005

(86) PCT No.: PCT/JP2005/023156
§ 371 (c)(1),
(2), (4) Date: Jun. 16, 2008

(87) PCT Pub. No.: WO2007/069332
PCT Pub. Date: Jun. 21, 2007

(65) Prior Publication Data
US 2009/0160282 A1    Jun. 25, 2009

(51) Int. Cl.
H02K 21/12 (2006.01)
(52) U.S. Cl. .............. 310/156.28; 310/156.38; 310/156.47; 310/156.48
(58) Field of Classification Search ........... 310/156.28, 310/156.38, 156.47–156.48
See application file for complete search history.

(56) References Cited

U.S. PATENT DOCUMENTS

| 4,667,123 | A | 5/1987 | Denk et al. | |
|---|---|---|---|---|
| 7,075,204 | B2 * | 7/2006 | Shiao et al. | 310/156.22 |
| 7,568,896 | B2 * | 8/2009 | Dooley | 417/356 |
| 2008/0143207 | A1 * | 6/2008 | Shah et al. | 310/156.08 |

FOREIGN PATENT DOCUMENTS

| JP | 3-11948 | 1/1991 |
|---|---|---|
| JP | 6-284611 | 10/1994 |

(Continued)

OTHER PUBLICATIONS

Machine translation JP06284611 (1994).*

(Continued)

*Primary Examiner*—Quyen Leung
*Assistant Examiner*—Jose A Gonzalez Quinones
(74) *Attorney, Agent, or Firm*—Antonelli, Terry, Stout & Kraus, LLP.

(57) ABSTRACT

A permanent-magnet generator rotor comprising a first rotor shaft end portion having in the axial center a hollow portion through which a bolt is passed; a second shaft end portion having in the axial center a hollow portion and a bearing portion through which the bolt is passed. A magnetic cylindrical body is sandwiched between the first and second shaft end portions. The permanent-magnet generator rotor includes the magnetic cylindrical body fixed between the first and second shaft ends, a permanent magnet held on the outer circumferential surface of the magnetic cylindrical body; a non-magnetic cylindrical body shrink-fit onto the outer circumferential surface of the permanent magnet; a stator disposed around the permanent magnet; and the bolt penetrating through the first and second shaft ends; the hollow portions in the generator, and the magnetic cylindrical body.

14 Claims, 4 Drawing Sheets

FOREIGN PATENT DOCUMENTS

| | | |
|---|---|---|
| JP | 06284611 A * | 10/1994 |
| JP | 11-234975 | 8/1999 |
| JP | 2001-12256 | 1/2001 |
| JP | 2001-513315 | 8/2001 |
| JP | 2003-88073 | 3/2003 |
| JP | 2004-232532 | 8/2004 |
| JP | 2004-336917 | 11/2004 |
| JP | 2004-3369717 | 11/2004 |
| JP | 2005-27440 | 1/2005 |
| JP | 2006353076 A * | 12/2006 |
| WO | WO 98/34324 | 8/1998 |

OTHER PUBLICATIONS

Machine Translation JP2006353076 (2006).*

* cited by examiner

PERMANENT-MAGNET GENERATOR ROTOR FOR GAS TURBINE, MANUFACTURING METHOD THEREFOR, AND GAS TURBINE

TECHNICAL FIELD

The present invention relates to a permanent-magnet generator rotor for gas turbines, a manufacturing method for it, and a gas turbine.

BACKGROUND ART

In general, small gas turbines, such as micro gas turbines, are so structured that a generator, a compressor, and a turbine are disposed on one and the same rotating shaft rotor in this order as disclosed in Patent Document 2. Permanent-magnet generator rotors having a permanent magnet are used as generators for use in such a gas turbine. As a permanent-magnet generator rotor, a generator rotor formed by integrating a columnar permanent magnet and a bearing portion by shrink fitting using a non-magnetic metal pipe is disclosed in Patent Document 1. Patent Document 3 discloses that an end of a shrink-fit non-magnetic metal pipe (supporter) is fixed to an end of a permanent magnet rotor by welding.

Patent Documents 2 and 3 disclose that a permanent-magnet generator rotor, a compressor, and a turbine are coaxially disposed and integrated by fixing them by a tie-bolt and a nut. Patent Document 4 discloses the configuration of a permanent-magnet generator rotor.

Patent Document 1: U.S. Pat. No. 4,667,123
Patent Document 2: JP-A-2001-012256
Patent Document 3: JP-A-2004-232532
Patent Document 4: JP-A-2004-336917

DISCLOSURE OF THE INVENTION

Problem to be Solved by the Invention

Patent Document 3 discloses a micro gas turbine formed by coaxially disposing a generator rotor, a compressor, and a gas turbine in this order and coupling them together using a tie-bolt and a nut to integrate them. The tie-bolt also functions as the rotating shaft of the turbine and the nut and the tie-bolt are tightened together at a shaft end. As described in Patent Document 1, permanent magnets are generally constructed of a sintered body of a magnet material composed predominantly of a rare-earth element. Therefore, they are relatively fragile and it is difficult to obtain high-level dimensional accuracy. When a permanent magnet is fixed on a rotor shaft, in general, a non-magnetic cylindrical body is attached around the permanent magnet to form a magnetic path in the axial direction and ensure the mechanical strength of the permanent magnet. Usually, the non-magnetic cylindrical body is fixed by shrink fitting or the like. In this case, it is difficult to ensure magnetic and mechanical coupling between the permanent magnet and the rotor shaft constructed of a magnetic material. This is because the permanent magnet is fragile, as mentioned above, and it cannot be firmly pressure-bonded to the rotor shaft.

An object of the invention is to correctly, reliably, and easily fix a permanent magnet of a permanent-magnet generator rotor. Another object of the invention is to provide a gas turbine structure wherein a generator rotor, a compressor, and a turbine can be integrally structured with ease.

Means for Solving the Problem

The present invention provides a permanent-magnet generator rotor comprising a first rotor shaft end portion having in the axial center a hollow portion through which a bolt is passed; a second shaft end portion having in the axial center a hollow portion and a bearing portion through which the bolt is passed. The permanent-magnet generator rotor has a magnetic cylindrical body fixed between the first and second shaft end portions, and a non-magnetic cylindrical body is shrink-fitted on an outer circumferential surface of the permanent magnet. Further, the present invention provides a gas turbine structure obtained by coaxially disposing the rotor, a compressor, and a turbine and integrating them by a tie-bolt and a nut.

Advantage of the Invention

According to the invention, the magnetic cylindrical body positioned on the axial center side of the rotor and the permanent magnet attached on the magnetic cylindrical body, and the rotor shaft ends positioned at both ends of the rotor can be easily and securely coupled. This facilitates the assembly of the rotor.

DESCRIPTION OF REFERENCE NUMERALS

Figure 1:
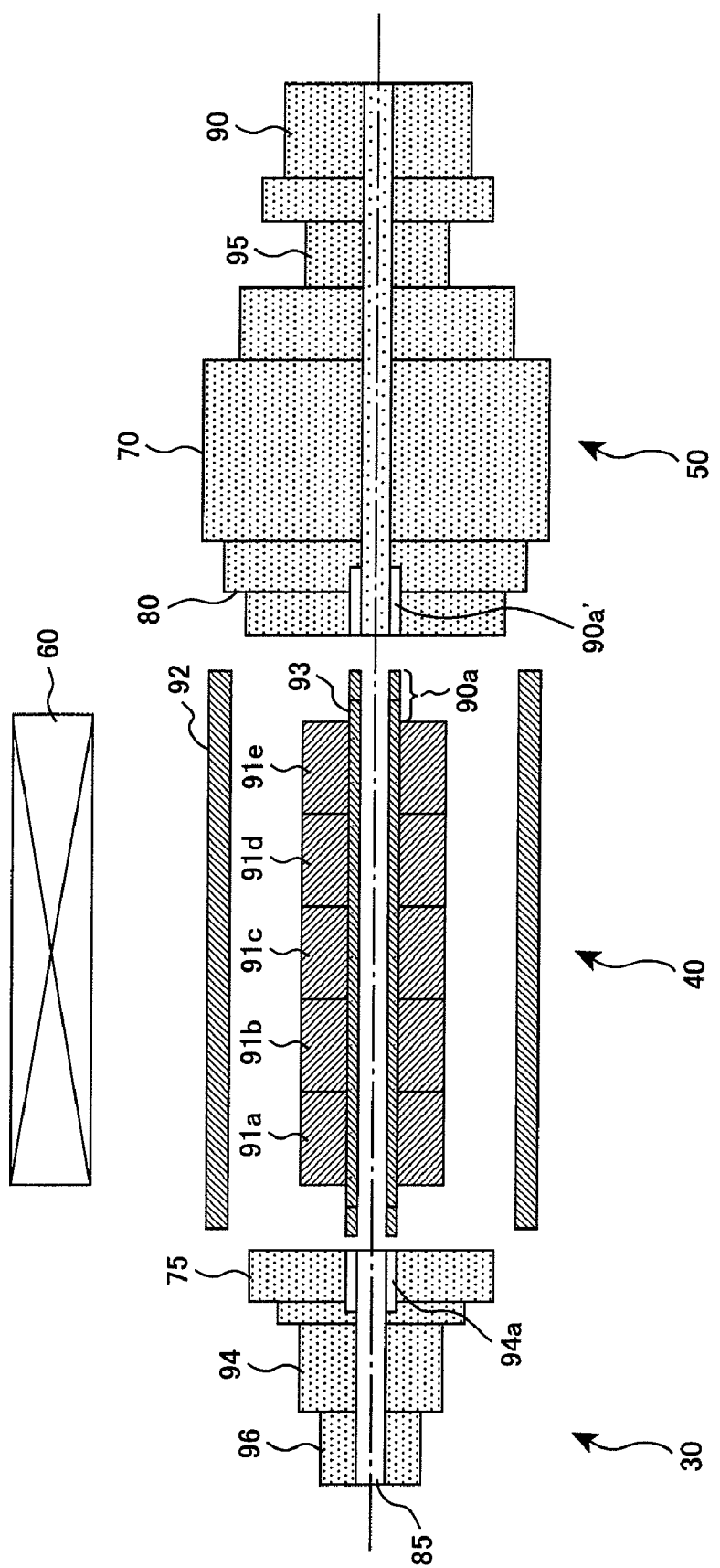
FIG. 1 This is a developed sectional view of a permanent-magnet generator rotor in an embodiment of the invention.

1—Turbine rotor, 2—Turbine, 3—Tie-bolt, 4—Compressor, 7—Generator, 10—Nut, 90—Rear-side shaft, 90a—Fitting hole, 91a, 91b, 91c, 91d, 91e—Ring-shaped permanent magnet, 92—Outer radius-side non-magnetic pipe, 93—Inner radius-side magnetic pipe, 94—Front-side shaft, 94a—Fitting hole, 96—Bearing portion, 97—Bolt jig, 98—Non-magnetic ring

BEST MODE FOR CARRYING OUT THE INVENTION

The following is the description of examples of typical embodiments of the invention.

(i) A permanent-magnet generator rotor comprising a first rotor shaft end portion having in the axial center a hollow portion through which a bolt is passed; a second shaft end portion having in the axial center a hollow portion and a bearing portion through which the bolt is passed. The permanent-magnet generator rotor has a magnetic cylindrical body sandwiched between the first and second shaft end portions. The permanent-magnet generator rotor includes the magnetic cylindrical body fixed between the first and second shaft ends, a permanent magnet held on the outer circumferential surface of the magnetic cylindrical body, a non-magnetic cylindrical body shrink-fit onto the outer circumferential surface of the permanent magnet, a stator disposed around the permanent magnet, and the bolt penetrating through the first and second shaft ends, the hollow portions in the generator, and the magnetic cylindrical body.

(ii) The permanent-magnet generator rotor characterized in that: the ends of the magnetic cylindrical body are sandwiched between the first and second shaft end portions; and they are inserted into first and second fitting holes respectively formed in the first and second shaft end portions.

(iii) The permanent-magnet generator rotor wherein the second shaft end portion has an arresting portion that supports one end of the non-magnetic cylindrical body.

(iv) The permanent-magnet generator rotor wherein the second shaft end portion has a large-diameter portion between the bearing portion and the arresting portion.

(v) A manufacturing method for a permanent-magnet generator rotor including a step of integrating the following: the permanent-magnet generator rotor having a non-magnetic cylindrical body shrink-fit onto the outer circumferential surface of a permanent magnet fixed onto a magnetic cylindrical body; a first rotor shaft end portion having a bearing and having in the axial center a hollow portion through which a bolt is passed; and a second shaft end portion having in the axial center a hollow portion and a bearing portion through which the bolt is passed. They are integrated by the bolt penetrating through the magnetic cylindrical body sandwiched between the first and second shaft end portions.

(vi) A gas turbine, which comprises a permanent magnet generator rotor comprising a first rotor shaft end portion having in the axial center a hollow portion through which a bolt is passed; a second shaft end portion having in the axial center a hollow portion and a bearing portion through which the bolt is passed. A magnetic cylindrical body is sandwiched between the first and second shaft end portions. The permanent-magnet generator rotor comprising a magnetic cylindrical body fixed between the first and second shaft ends, a permanent magnet held on the outer circumferential surface of the magnetic cylindrical body, a non-magnetic cylindrical body shrink-fit onto the outer circumferential surface of the permanent magnet, a stator disposed around the permanent magnet, and the bolt penetrating through the first and second shaft ends, the hollow portions in the generator, and the magnetic cylindrical body. The turbine includes: the permanent-magnet generator rotor; a compressor connected to the second shaft end portion; a turbine connected to the compressor; and a bolt that couples together the permanent-magnet generator rotor, the compressor, and the turbine.

(vii) The gas turbine wherein the ends of the magnetic cylindrical body are sandwiched between the first and second shaft end portions and inserted into first and second fitting holes respectively formed in the first and second shaft end portions.

(viii) The gas turbine wherein the second shaft end portion includes an arresting portion that supports one end of the non-magnetic cylindrical body.

(ix) The gas turbine wherein the second shaft end portion has a large-diameter portion between the bearing portion and the arresting portion.

(v) The gas turbine wherein the first and second shaft end portions are magnetic materials.

The foregoing are so constructed that the stator is disposed in correspondence with the generator rotor and the permanent magnet. Needless to add, the compressor and the turbine are respectively disposed in a casing. Therefore, in the description of the invention, the stator of the generator rotor, the casing of the compressor, and the casing of the turbine will be omitted unless specially required.

It is desirable that the permanent magnet should be used in the shape of a ring divided into multiple rings in the direction of the axis of the rotor. The reason for this is as follows: fabricating a large permanent magnet degrades dimensional accuracy and impairs mechanical reliability. Forming the permanent magnet in the above-mentioned ring shape solves the above problem and makes it possible to more favorably bring the divided magnets into tight contact with the surface of the above magnetic cylindrical body.

According to an embodiment of the invention, the following measure is desirable in a gas turbine including a turbine, a compressor, and a permanent-magnet generator rotor constructed coaxially with the turbine and the compressor: the permanent-magnet generator is sandwiched between a magnetic cylindrical body (magnetic metal pipe) positioned on the inner radius side and a non-magnetic metal pipe positioned on the outer radius side; it is constructed of ring-shaped permanent magnets divided in the axial direction; and the turbine, compressor, and permanent-magnet generator are tightened together using a bolt penetrating the inner radius-side metal pipe. With respect to the bolt, the measure described in Patent Document 4 may be taken. That is, the rotating shaft of the turbine may be extended, passed through the hollow holes in the compressor and the generator rotor, and tightened at its end by a nut.

According to the invention, the ring-shaped permanent magnets are fit onto the inner pipe and the outer pipe is fit onto the ring-shaped permanent magnets by shrink fitting or the like. This facilitates a machining process for providing an interference between the ring-shaped permanent magnets and the outer pipe. Since ring-shaped permanent magnets are divided in the axial direction, it is possible to enhance the accuracy of machining each permanent magnet to form a bore for passing through the inner pipe. Provision of the inner pipe in the bores in the ring permanent magnets makes it possible to protect the magnets when the bolt is passed during assembling. That is, the permanent-magnet rings low in strength can be prevented from being damaged due to contact with a bolt when the bolt is passed. Further, the ring-shaped magnets can be protected against impact arising from resonance of the bolt and thus the reliability of the generator can be enhanced.

Hereafter, description will be given to embodiments of the invention with reference to drawings.

First Embodiment

FIG. 1 is a developed sectional view of a generator rotor for gas turbines in an embodiment of the invention. In the drawing, the first shaft end portion 30 has a bearing 96 and a front-side shaft 94. The first shaft end portion 30 has a flange portion 75 on the generator rotor side. On the side of the central axis of the flange portion 75, it has a fitting hole 94a for inserting an end of the magnetic cylindrical body. The second shaft end portion 50 has on the generator rotor side a part including an arresting portion 80, a large-diameter portion 70 adjacent thereto, a bearing portion 95, and a rear-side shaft 90. The large-diameter portion 70 is for enhancing the rigidity of the rotor shaft. It is desirable that this large-diameter portion should be so set that the following is implemented: when the generator rotor, compressor, and turbine are coaxially disposed and integrated, it is positioned substantially in the center of the shaft length of the entire gas turbine.

In the second shaft end portion 50 opposite the first shaft end portion 30, a fitting hole 90a' for inserting an end 90a of the magnetic cylindrical body is formed.

The arresting portion 80 is for abutting one end of the non-magnetic cylindrical body 92 for bringing the permanent magnets 91a, 91b, 91c, 91d, 91e into tight contact with the magnetic cylindrical body 93. This makes it possible to shrink-fit the non-magnetic cylindrical body with accuracy. The generator rotor is constructed by disposing it in appropriate relation between it and a stator 60 corresponding to the permanent magnets of the permanent-magnet generator rotor. This arresting portion plays a very important role in the operation of shrink-fitting the non-magnetic cylindrical body. That is, the shrink fitting operation can be easily and reliably carried out by utilizing this arresting portion to position the non-magnetic cylindrical body.

The generator rotor is constructed by tightening together the first shaft end portion, rotor, and second shaft end portion using a tie-bolt (not shown in FIG. 1) inserted along the central axis of the rotor and a nut (not shown in FIG. 1).

Figure 2:
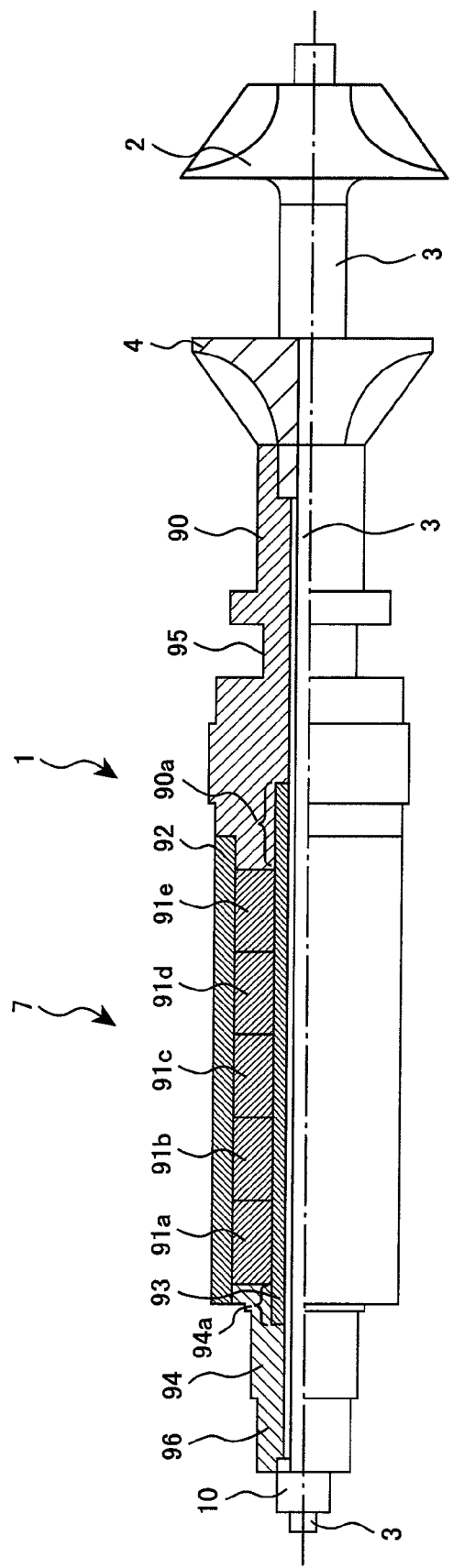
FIG. 2 This is a partial sectional view of a gas turbine in the embodiment of the invention.

FIG. 2 is a partial sectional view of a gas turbine 1 obtained by assembling the generator rotor illustrated in FIG. 1, a compressor, and a turbine The turbine rotor 1 is constructed of: the turbine 2, the compressor 4, and the generator rotor 7 constructed coaxially with the turbine 1 and the compressor 2. A tie-bolt 3 is joined to the rotation center of the turbine 2. The turbine rotor is constructed by passing the tie-bolt 3 through through holes provided in the rotation center of each of the compressor 4 and the generator 7, stacking the compressor 4 and the generator rotor 7, and tightening an end of the bolt 3 with a nut 10.

Description will be given to the procedure for assembling the generator 7 in relation to its structure. In the generator rotor 7, one end of the inner radius-side magnetic pipe 93 is fixed on the rear-side shaft 90 by inserting it into the fitting hole 90a formed in the rear-side shaft 90 with a certain interference.

On the inner radius-side magnetic pipe 93, the ring-shaped permanent magnets 91a, 91b, 91c, 91d, 91e, divided in the axial direction are inserted into the pipe 93 with certain gaps provided in the axial direction of the divided magnets. The other end of the inner radius-side magnetic pipe 93 is inserted into the fitting hole 94a in the front-side shaft 94 with a shrink-fit clearance provided for the front-side shaft 94.

The inner radius-side magnetic pipe 93, rear-side shaft 90, ring permanent magnets 91a, 91b, 91c, 91d, 91e, and front-side shaft 94 are integrated. At this time, they are fit together by the outer radius-side non-magnetic pipe 92 with the shrink-fit clearance Y provided in the radial direction. The shrink-fit clearance Y can be provided by using: shrink fitting to increase the temperature of the outer radius-side non-magnetic ring 92; cooling shrink-fitting to lower the temperature of the inner radius-side magnetic pipe 93, rear-side shaft 90, ring permanent magnets 91a, 91b, 91c, 91d, 91e, and front-side shaft 94, or a combination of cooling shrink-fit and shrink fitting.

The interference Y is appropriately set so that both of the following are implemented: the contact face of the inner radius-side magnetic pipe 93, rear-side shaft 90, ring permanent magnets 91a, 91b, 91c, 91d, 91e, front-side shaft 94, or the outer radius-side non-magnetic ring 92 is not slid by torque applied to the generator rotor 7; and the inner radius-side magnetic pipe 93, rear-side shaft 90, ring permanent magnets 91a, 91b, 91c, 91d, 91e, front-side shaft 94, or outer radius-side non-magnetic ring 92 is not caused to get beyond the yield stress or destructive strength of its material by compression load arising from the interference.

Then, the tie-bolt 3 joined to the rotation center of the turbine 2 is passed through the hole formed in the rear-side shaft 90, the inner radius-side magnetic pipe 93, and the hole formed in the front-side shaft 94. Then, the compressor 4 is clamped between the generator 7 and the turbine 2 and the end of the bolt 3 is tightened with the nut 10 to assemble the turbine rotor 1. The rear-side shaft 90 and the front-side shaft 94 have the bearing portions 95, 96 and the turbine rotor 1 can bear its own weight by the bearing portions 95, 96.

According to this embodiment of the invention, the following can be implemented in the rotor constructed of the turbine, compressor, and permanent-magnet generator constructed coaxially with the turbine and the compressor: the permanent-magnet generator, turbine, and compressor can be integrally structured with ease. Since the inner radius-side magnetic pipe 93 is provided inside the ring-shaped permanent magnets, the following can be implemented: the magnets can be protected when the bolt 3 is passed during assembling; and when the rotation speed of the turbine rotor is increased or reduced, the ring-shaped magnets 91a, 91b, 91c, 91d, 91e can be protected against impact arising from resonance of the bolt 3. As a result, the reliability of the generator 7 can be enhanced.

Figure 3:
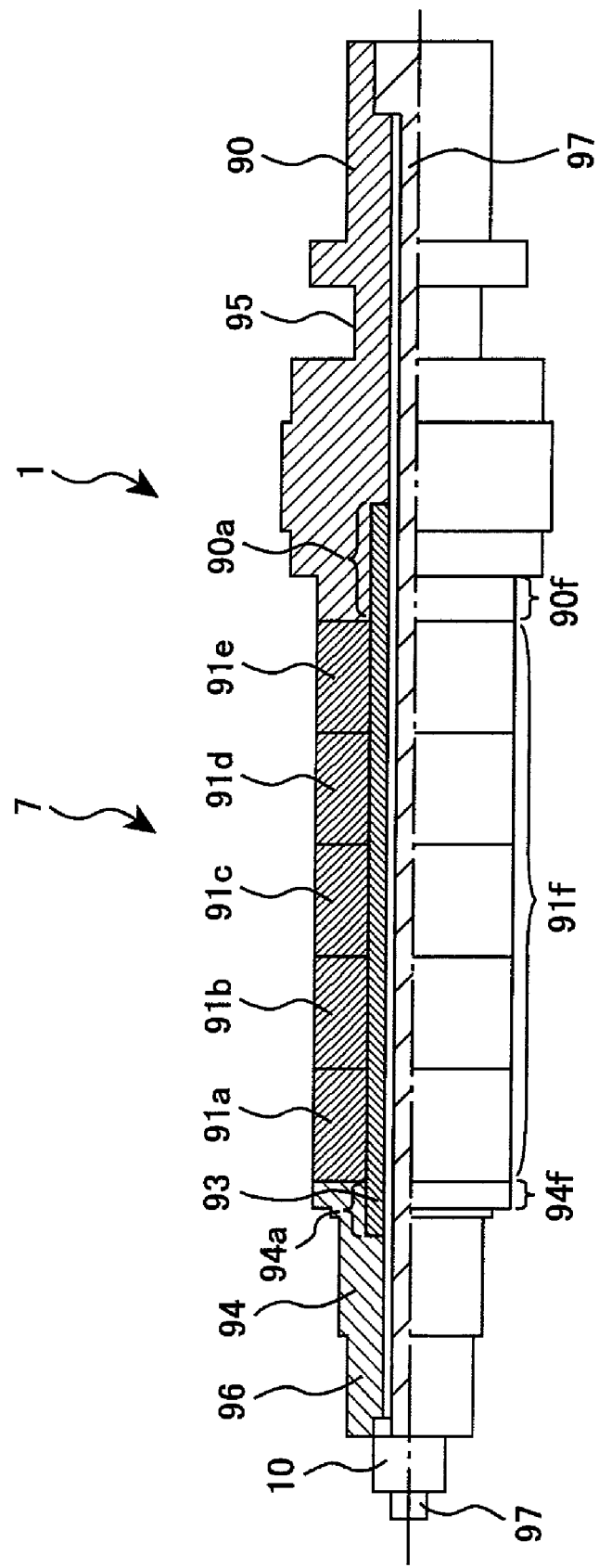
FIG. 3 This is a partial sectional view of a gas turbine in another embodiment of the invention.

Detailed description will be given to a method for fabricating the turbine rotor 1 with reference to FIG. 3. The inner radius-side magnetic pipe 93 is inserted into the fitting hole 90a formed in the rear-side shaft 90 with a shrink-fit clearance provided for the rear-side shaft 90. This shrink-fit clearance is for shrink fit, and the inner radius-side magnetic pipe 93 is pushed by press or shrink fitting or cooling shrink-fitting is used. This prevents the interference from being loosened when the generator 7 is assembled and makes it possible to enhance the accuracy of assembling of the permanent-magnet rings, described later. Setting can be so made that the shrink-fir clearance is not loosened by centrifugal force arising from rotation and change in the temperature of the generator 7.

Next, the ring-shaped permanent magnets 91a, 91b, 91c, 91d, 91e divided in the axial direction are fit onto the inner radius-side magnetic pipe 93 with a certain gap X provided in-between. This gap is a radial gap set to 20 µm or below. The gap is set to such a value that the following is implemented when the outer radius-side non-magnetic pipe is fit: the inner circumferential surfaces of the ring-shaped permanent magnets 91a, 91b, 91c, 91d, 91e and the outer circumferential surface of the inner radius-side magnetic pipe 93 are brought into contact with each other. In this invention, the accuracy of machining for providing the gap X can be enhanced by dividing the permanent magnet of the generator 7 in the axial direction like the ring-shaped permanent magnets 91a, 91b, 91c, 91d, 91e. That is, dividing the magnet in the axial direction makes it possible to shorten the hole drilling length and thus enhance the accuracy of machining the ring-shaped permanent magnets 91a, 91b, 91c, 91d, 91e to form bores therein. As described in Patent Document 1, in general, permanent magnets are sintered materials using a rare-earth element and difficult to machine as compared with metals. To cope with this, this invention is so structured that the outside diameter of the inner radius-side magnetic pipe 93 can be matched with the inside diameter of the ring permanent magnets 91a, 91b, 91c, 91d, 91e when they are machined. This makes it possible to easily enhance the accuracy of machining for providing the gap X.

Next, the inner radius-side magnetic pipe 93 protruded from the bore in the ring permanent magnet 91a is inserted and fixed into the fitting hole 94a in the front-side shaft 94. An interference for interference fitting is provided between the inner radius-side magnetic pipe 93 and the fitting hole 94a. The inner radius-side magnetic pipe 93 is pushed into the fitting hole 94a by press or inserted into it using shrink fitting or cooling fitting. This prevents the interference from being loosened when the generator 7 is assembled and makes it possible to enhance the accuracy of assembling of the permanent-magnet rings, described later. During operation, the interference is prevented from being loosened by centrifugal force arising from rotation and change in the temperature of the generator 7, and change in torque transmission or unbalanced shaft vibration is not caused.

Next, the inner radius-side magnetic pipe 93, rear-side shaft 90, ring-shaped permanent magnets 91a, 91b, 91c, 91d, 91e, and front-side shaft 94 are subjected to a machining process as are integrated. The respective outer circumferential portions 90f, 91f, 94f of the inner radius-side magnetic pipe 93, rear-side shaft 90, ring permanent magnets 91a, 91b, 91c, 91d, 91e, and front-side shaft 94 are machined by turning on a lathe or grinding. The inner radius-side magnetic pipe 93, rear-side shaft 90, ring-shaped permanent magnets 91a, 91b, 91c, 91d, 91e, and front-side shaft 94 are fit together and integrated by the outer radius-side non-magnetic ring 92 with a certain interference Y provided. According to this embodiment of the invention, a machining process can be carried out with the inner radius-side magnetic pipe 93, rear-side shaft 90, ring permanent magnets 91a, 91b, 91c, 91d, 91e, and front-side shaft 94 integrated. Therefore, the accuracy of machining for providing the interference Y can be enhanced.

In this embodiment, the following measure may be taken when a machining process or shrink fitting is carried out: a bolt jig 97 and the nut 10 are used to tighten up the rear-side shaft 90, ring-shaped permanent magnets 91a, 91b, 91c, 91d, 91e, and front-side shaft 94 to provide contact pressure to their respective axial contact faces and they are integrated. The accuracy of machining the outer circumferential surfaces 90f, 91f, 94f on a lathe or by grinding can be enhanced by appropriately setting the perpendicularity and the surface roughness of each axial contact face. Further, the rear-side shaft 90, ring-shaped permanent magnets 91a, 91b, 91c, 91d, 91e, and front-side shaft 94 can be prevented from being bent when the outer radius-side non-magnetic pipe 92 is fit.

Figure 4:
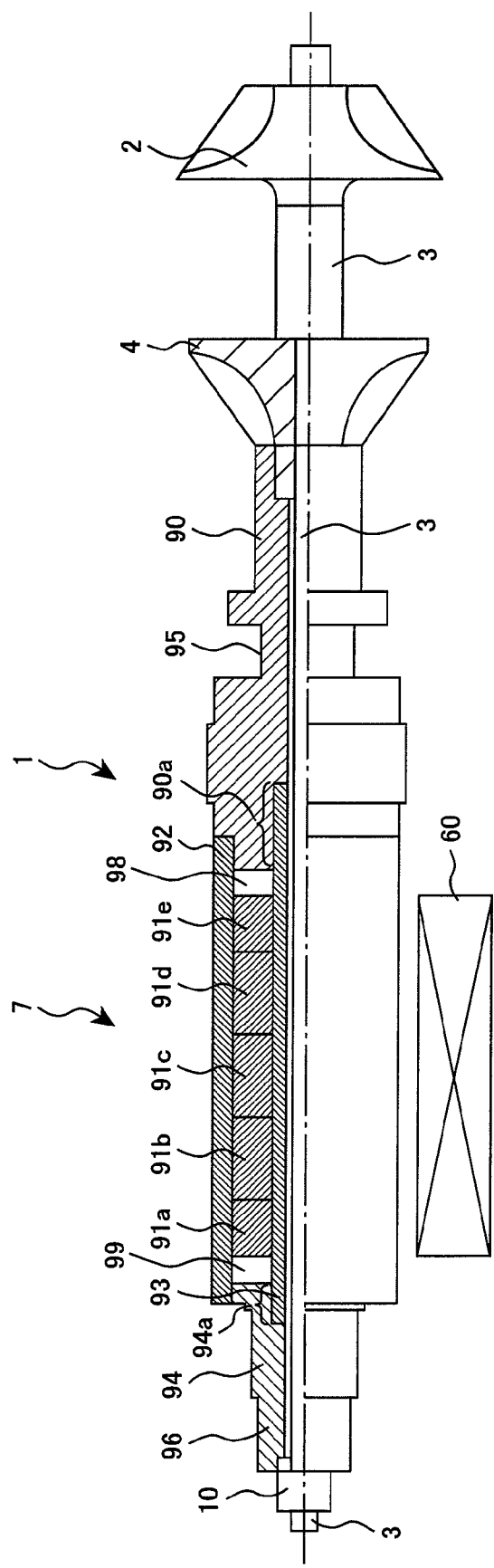
FIG. 4 This is a sectional view of a gas turbine in another embodiment of the invention.

In the embodiment illustrated in FIG. 4, a magnetic material is used for the rear-side shaft 90 and the front-side shaft 94 in the structure illustrated in FIG. 2. This makes it possible to attract leakage flux from an end of a stationary coil 60 installed around the ring permanent magnets 91a, 91b, 91c, 91d, 91e to the rear-side shaft 90 and the front-side shaft 94. As a result, induction heating due to leakage flux is prevented. That is, induction heating due to leakage flux is caused in the rear-side shaft 90 and the front-side shaft 94 to prevent induction heating in any other area. The rear-side shaft 90 and the front-side shaft 94 have the respective bearing portions 95, 96 and can get rid of heat produced by induction heating by a fluid circulating in the bearing portions. The generator rotor is so disposed that it is in proper positional relation between it and the stator 60 and the casing (now shown) around it.

In the example in FIG. 4, a non-magnetic ring 98, 99 is provided in front of and behind the ring permanent magnets 91a, 91b, 91c, 91d, 91e. This makes it possible to prevent flux leakage from the ring permanent magnets 91a, 91b, 91c, 91d, 91e and enhance the efficiency of the generator. In the embodiments illustrated in FIGS. 1 and 2, a magnetic material is used for the inner radius-side pipe. This may be replaced with a non-magnetic material according to circumstances.

In the above embodiments of the invention, the ring permanent magnets are fit onto the inner pipe and the outer pipe is fit onto the ring permanent magnets by shrink fitting or the like. This facilitates a machining process for providing an interference between the ring permanent magnets and the outer pipe. Further, since the ring-shaped permanent magnets are divided in the axial direction, it is possible to enhance the accuracy of machining for forming bores for passing the inner pipe in the permanent magnets. Provision of the inner pipe inside the ring permanent magnets makes it possible to protect the magnets when the bolt is passed during assembling and protect the ring magnets against impact arising from resonance of the bolt. As a result, the reliability of the generator can be enhanced.

INDUSTRIAL APPLICABILITY

The invention can be applied, especially, to small turbines, such as micro gas turbines.

The invention claimed is:

1. A permanent-magnet generator rotor comprising:
    a first shaft end portion having in an axial center a hollow portion through which a bolt is passed;
    a second shaft end portion having in the axial center a hollow portion and a bearing portion through which the bolt is passed;
    a magnetic cylindrical body fixed between the first and second shaft end portions;
    a permanent magnet held on an outer circumferential surface of the magnetic cylindrical body, the permanent magnet having a cylindrical form and being divided into plural ring-shaped magnet pieces in an axial direction;
    a non-magnetic cylindrical body shrink-fit onto the outer circumferential surface of the permanent magnet;
    a stator disposed around the permanent magnet; and
    a bolt penetrating through the first and second shaft end portions, the hollow portions, and the magnetic cylindrical body.

2. The permanent-magnet generator rotor according to claim 1, wherein the ends of the magnetic cylindrical body are sandwiched between the first and second shaft end portions and inserted into first and second fitting holes respectively formed in the first and second shaft end portions.

3. The permanent-magnet generator rotor according to claim 1, wherein the second shaft end portion includes an arresting portion supporting one end of the non-magnetic cylindrical body.

4. The permanent-magnet generator rotor according to claim 3, wherein the second shaft end portion further includes a large-diameter portion disposed between the bearing portion and the arresting portion.

5. A method of manufacturing a permanent-magnet generator rotor comprising:
    integrating the permanent-magnet generator rotor having a non-magnetic cylindrical body shrink-fit onto an outer circumferential surface of a permanent magnet fixed onto a magnetic cylindrical body, the permanent magnet having a cylindrical form and being divided into plural ring-shaped magnet pieces in an axial direction;
    assembling a first rotor shaft end portion to one end of the magnetic cylindrical body of the permanent-magnet generator rotor, the first rotor shaft end portion having a bearing portion and having in an axial center a hollow portion through which a bolt is passed; and
    assembling a second shaft end portion to an opposite end of the magnetic cylindrical body of the permanent-magnet generator rotor, the second rotor shaft end portion having in the axial center a hollow portion and a bearing portion through which the bolt is passed,
    wherein the bolt penetrates through the magnetic cylindrical body sandwiched between the first and second shaft end portions.

6. A gas turbine comprising:
    a permanent magnet generator rotor comprising:
        a first shaft end portion having in an axial center a hollow portion through which a bolt is passed, a second shaft end portion having in the axial center a hollow portion and a bearing portion through which a bolt is passed, a magnetic cylindrical body fixed between the first and second shaft end portions, a permanent magnet held on an outer circumferential surface of the magnetic cylindrical body, the permanent magnet having a cylindrical form and being divided into plural ring-shaped magnet pieces in an axial direction, a non-magnetic cylindrical body shrink-fit onto the outer circumferential surface of the permanent magnet, a stator disposed around the permanent magnet, and a bolt penetrating through the first and second shaft ends, the hollow portions, and the magnetic cylindrical body;

a compressor connected to the second shaft end portion of the permanent magnet generator rotor; and a turbine connected to the compressor, wherein the bolt assembles together the permanent magnet generator rotor, the compressor, and the turbine.

7. The gas turbine according to claim 6, wherein the ends of the magnetic cylindrical body are sandwiched between the first and second shaft end portions and inserted into first and second fitting holes respectively formed in the first and second shaft end portions.

8. The gas turbine according to claim 6, wherein the second shaft end portion includes an arresting portion supporting one end of the non-magnetic cylindrical body.

9. The gas turbine according to claim 8, wherein the second shaft end portion further includes a large-diameter portion disposed between the bearing portion and the arresting portion.

10. The gas turbine according to claim 6, wherein the first and second shaft end portions are magnetic materials.

11. The permanent-magnet generator rotor according to claim 1, wherein inner circumferential surfaces of the plural ring-shaped magnet pieces are brought into contact with the outer circumferential surface of the magnetic cylindrical body.

12. The permanent-magnet generator rotor according to claim 3, wherein the arresting portion is arranged to abut one end of the non-magnetic cylindrical body for bringing the plural ring-shaped magnet pieces into contact with the magnetic cylindrical body.

13. The gas turbine according to claim 6, wherein inner circumferential surfaces of the plural ring-shaped magnet pieces are brought into contact with the outer circumferential surface of the magnetic cylindrical body of the permanent magnet generator rotor.

14. The gas turbine according to claim 8, wherein the arresting portion is arranged to abut one end of the non-magnetic cylindrical body for bringing the plural ring-shaped magnet pieces into contact with the magnetic cylindrical body.

* * * * *